United States Patent
Potempa (10) Patent No.: US 9,392,782 B2
(45) Date of Patent: Jul. 19, 2016

(54) WATERPROOF AND BUOYANT ROD AND REEL CARRYING CASE AND SEAT CUSHION COMBINATION

(71) Applicant: Kenneth J. Potempa, Marlborough, MA (US)

(72) Inventor: Kenneth J. Potempa, Marlborough, MA (US)

( * ) Notice: Subject to any disclaimer, the term of this patent is extended or adjusted under 35 U.S.C. 154(b) by 0 days.

(21) Appl. No.: 14/460,619

(22) Filed: Oct. 23, 2014

(65) Prior Publication Data

US 2016/0113263 A1    Apr. 28, 2016

(51) Int. Cl.
| | |
|---|---|
| *A01K 97/08* | (2006.01) |
| *A45F 4/12* | (2006.01) |
| *A45F 4/02* | (2006.01) |
| *A41D 3/08* | (2006.01) |
| *A47C 7/02* | (2006.01) |
| *A47C 7/18* | (2006.01) |
| *A47G 9/02* | (2006.01) |

(52) U.S. Cl.
CPC . *A01K 97/08* (2013.01); *A41D 3/08* (2013.01); *A47C 7/022* (2013.01); *A47C 7/18* (2013.01); *A47G 9/0207* (2013.01); *A45F 4/12* (2013.01); *A45F 2004/026* (2013.01); *Y10S 224/924* (2013.01)

(58) Field of Classification Search
CPC ............. A45C 2009/002; A01K 97/08; A45F 2004/026; A45F 4/12; A41D 15/04; Y10S 224/922
USPC ........ 224/577, 155, 922; D3/260; 206/315.11
See application file for complete search history.

(56) References Cited

U.S. PATENT DOCUMENTS

| | | | | |
|---|---|---|---|---|
| 4,164,798 A | * | 8/1979 | Weber | A47C 7/022 297/452.26 |
| 4,535,878 A | * | 8/1985 | Grahl | A45C 3/10 190/1 |
| 4,696,122 A | | 9/1987 | Van Der Zyl | |
| 4,726,141 A | | 2/1988 | McBride et al. | |
| 5,040,324 A | | 8/1991 | Rivera et al. | |
| 5,046,279 A | | 9/1991 | Smith et al. | |
| 5,071,048 A | | 12/1991 | Price et al. | |
| 5,240,330 A | * | 8/1993 | Thompson | A45C 9/00 224/577 |
| 5,327,669 A | * | 7/1994 | Lannan | A01K 97/08 206/315.11 |
| 5,414,881 A | * | 5/1995 | Terrazas | A41D 15/04 190/1 |
| 5,417,354 A | | 5/1995 | Jones | |
| 5,425,194 A | * | 6/1995 | Miller | A01K 97/08 206/315.11 |
| 5,444,881 A | * | 8/1995 | Landi | A61G 5/1043 297/452.41 |
| 5,547,079 A | * | 8/1996 | Pino | A01K 97/08 206/315.11 |

(Continued)

*Primary Examiner* — Justin Larson
(74) *Attorney, Agent, or Firm* — Kriegsman & Kriegsman (57) ABSTRACT

The present invention relates to a soft and durable carrying case for transporting one or more fishing rods (typically a 2 piece rod) and reels that affords protection as well as buoyancy if dropped in the water. The inner foam material is specially made, placed and secured into the nylon shell to aid in buoyancy and protecting the rods and reels from damage. The carrying case can also be used to transport other types if equipment that are a maximum of 43 inches in length. The present invention can be reconfigured into a seat cushion after taking out the rods and reels. Said seat cushion is designed in such a manner as to prevent pain to the tailbone. The dual usage capability of the present invention allows for the consumer to alleviate 2 problems (carrying a fishing rod and reel easily) and preventing pain to the tailbone when sitting down while fishing. Another feature of the present invention is a 3rd or 4th use whereby, the carrying case can be further reconfigured as a blanket or poncho. The case is made of nylon, polyester and foam construction or other suitable materials for cushioning and warming effect.

6 Claims, 13 Drawing Sheets

(56) References Cited

U.S. PATENT DOCUMENTS

| | | | | |
|---|---|---|---|---|
| 5,884,331 | A * | 3/1999 | Barajas | A41D 3/08 2/69 |
| 5,893,502 | A * | 4/1999 | Redzisz | A01K 97/00 190/1 |
| 5,927,575 | A * | 7/1999 | Gatling | A01M 31/02 224/153 |
| 5,944,241 | A * | 8/1999 | Globig | A01M 31/02 182/187 |
| 6,036,067 | A | 3/2000 | Alcorn | |
| 6,119,858 | A * | 9/2000 | Davidson | A01K 97/08 190/109 |
| 6,275,993 | B1 * | 8/2001 | McCarley | A41D 15/04 2/209.11 |
| 6,367,106 | B1 * | 4/2002 | Gronsman | A47C 4/54 5/655.3 |
| D489,176 | S * | 5/2004 | Bazen | D3/260 |
| 6,789,713 | B1 * | 9/2004 | Redzisz | A01K 97/08 206/315.11 |
| 6,851,127 | B1 * | 2/2005 | Khan | A41D 13/00 2/84 |
| 7,044,297 | B2 | 5/2006 | Terrell | |
| D529,745 | S * | 10/2006 | Eskandry | D6/595 |
| 7,225,486 | B2 * | 6/2007 | Jackson, III | A47G 9/1027 5/653 |
| 7,877,922 | B1 | 2/2011 | Petrie et al. | |
| 8,464,374 | B1 * | 6/2013 | Thayer | A47G 9/06 2/69 |
| 8,566,987 | B1 * | 10/2013 | Burge | A47C 27/15 297/452.26 |
| 2004/0073985 | A1 * | 4/2004 | Riccelli | A41D 15/04 2/69 |
| 2005/0039260 | A1 * | 2/2005 | Tyler | A41D 15/04 5/417 |
| 2005/0236450 | A1 * | 10/2005 | Iannini | B63B 35/7946 224/577 |
| 2007/0028342 | A1 * | 2/2007 | Chan | A41D 13/04 2/48 |
| 2010/0059558 | A1 * | 3/2010 | Robinson | A41D 3/08 224/155 |
| 2010/0122395 | A1 * | 5/2010 | Wall | A41D 15/04 2/84 |
| 2013/0020360 | A1 * | 1/2013 | Brunnemer | A01K 97/06 224/249 |
| 2015/0257377 | A1 * | 9/2015 | Moore, Jr. | A01K 97/08 43/26 |

* cited by examiner

WATERPROOF AND BUOYANT ROD AND REEL CARRYING CASE AND SEAT CUSHION COMBINATION

RELATED APPLICATIONS

This application claims priority from U.S. Provisional Patent Application No. 61/867,107, filed Aug. 18, 2013, which is hereby incorporated by reference.

BACKGROUND OF THE INVENTION

This invention relates to a soft case for transporting a maximum 43 inch long per piece fishing rod (typically a 2 piece rod) and reel or multiple rods and reels that affords rod protection as well as buoyancy of the case if dropped in the water. Also, the case can be refolded into a seat cushion after taking out the rods and reels. Said cushion is designed in such a manner as to prevent pain to the tailbone. The dual usage capability of the present invention allows for the consumer to alleviate 2 problems (carrying a fishing rod and reel easily) and preventing pain to the tailbone when sitting down while fishing. Another feature of the carrying case is that it can be used as a blanket or poncho. The case is made of nylon, polyester and foam construction or other suitable materials for cushioning and warmth effect.

1. Objects of the Invention

The present invention is specifically designed to act in a myriad of modes e.g., carrying fishing rods and reels, convert to a seat cushion for use while fishing, use as a blanket after fishing to keep warm or for sleep, and a poncho to protect against the elements.

To eliminate the sinking of the device if dropped in water, a foam element is employed for rod protection as well as to as facilitate the buoyancy of the carrying case. Fishing rods and reels can be family heirlooms or expensive and loss by sinking is a reality that is prevented by the present invention while, the rods and reels are in the present invention.

In addition, the present invention to provide the following benefits not encompassed by the prior art:
1. Can be transportable and/or mobile:
2. Can be self-contained unit to serve as a multitude of functions:
3. In contrast to other carrying apparatus, which perform one function.
4. The present invention can be transformed into a seat cushion for use while fishing, boating, camping etc.
5. The present invention can be used as a poncho in a third embodiment in which a zippered hole is constructed to allow for protection against the elements when the rod and reels are removed.

Another key feature of the Invention relates to the function of a poncho or rain gear when not employed as a rod and reel carrier or seat cushion. This feature is unique to the present invention and not seen with other rod and reel carriers.

A further key feature of the present Invention involves is the buoyancy of the device whether the rods and reels are being carried, or used as a seat cushion. The device will not sink due to the foam insulation material and construction of the device employing "hook and loop" and/or zipper closures.

The present invention has several compartments that allow for storage and placement of more than one rod and reel of varying sizes. The carrier can hold up to 4 rod and reels, and still comport with the buoyancy aspect of the invention. A fisherman may have multiple rods and reels that need transporting, or just one. The present invention allows for this choice. Also, for convenience of carrying their rods and reels to and from their car. Further, the present invention can be reconfigured or made larger to accommodate deep sea fishing that requires larger rods and reels.

The foam insert is made of a special material that allows for buoyancy while, maintaining its foam qualities for use as a blanket or seat cushion. In combination with the nylon outer shell, makes for the water proof aspect and floating ability. The foam insert also protects the rods and reels from damage when dropped.

Further, the present invention can be made with "hook and loop" fasteners that allow for quicker and easier wrapping and unwrapping the rods and reels, converting into the seat cushion and poncho. The use of "hook and loop" does not affect the buoyancy of the invention, and still maintains the non-sinking feature of the invention when loaded with rods and reels. The present invention will not sink when empty.

The present invention can hold up to 4.5 pounds of rods and reels without sinking if, dropped into a lake, stream or ocean. The weight of 4.5 pounds is a standard weight for 4 rods and reels.

The present invention can be used to carry other equipment that are linear at 43 inches in length maximum per piece such as, rifles, shotguns, bows and arrows, etc.

Description of the Prior Art

Normal carrying cases are made of rigid material such as leather, plastic or metal, and have a propensity to sink. Most are rectangular in shape and do not serve other purposes like the present invention. Further, other prior art devices are usually not water-proof or made of material to prevent the case from sinking if dropped into the water. While most prior art carriers can protect against the weather, most are not water tight and cannot be used for other purposes, such as a blanket, poncho or seat cushion. Most prior art rod and reel carriers are one-dimensional.

An example is U.S. Pat. No. 7,877,922 to Petrie et al that describe a weather tight storage device and carrier for a single or multiple rods that attach to a vehicle roof, and can be dismounted and carried to a desired location. This is a limited, one-dimensional use and does not have other uses such as the present invention.

Another example is U.S. Pat. No. 6,668,481 to Garcia which describes a hard shell case for an assembled fishing rod and reel includes forward and rearward rod cover tubes and a laterally hinged reel case. This prior art is specifically designed to protect and carrier the rods and reels, and has no other uses.

Lastly, a final example of a one-dimensional use rod and reel carrier is U.S. Pat. No. 6,343,728 to Carbone which describes; a support bag for the enclosure and controlled support of a fishing rod and reel arrangement. The elongated flexible enclosure bag has a first end and a second end, each of the ends being open for receipt of a fishing rod therethrough. The enclosure bag being defined by a first and a second multilayer sidewall. A reel-enclosing pouch compartment is located adjacent the first end of the elongated bag, arranged to protectively enclose the reel.

This invention does not have the buoyancy feature of the present invention, and lacks the multi-use features of the present invention.

DESCRIPTION OF THE PREFERRED EMBODIMENT

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention generally provides a way to store, protect and carrier fishing rods and reels.

Figure 1:
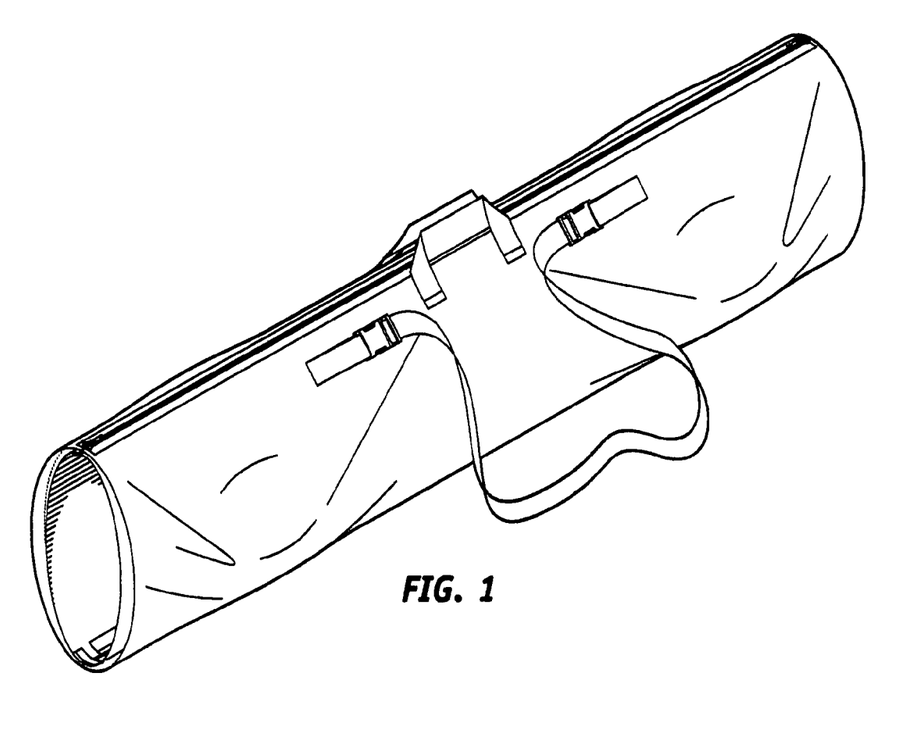
FIG. 1 is a side perspective view of the preferred embodiment of the present invention in the closed position after placement of the rod and reels.

FIG. 1 illustrates the present invention containing the rods and reels forming the water proof and buoyant feature as described herein.

Figure 2:
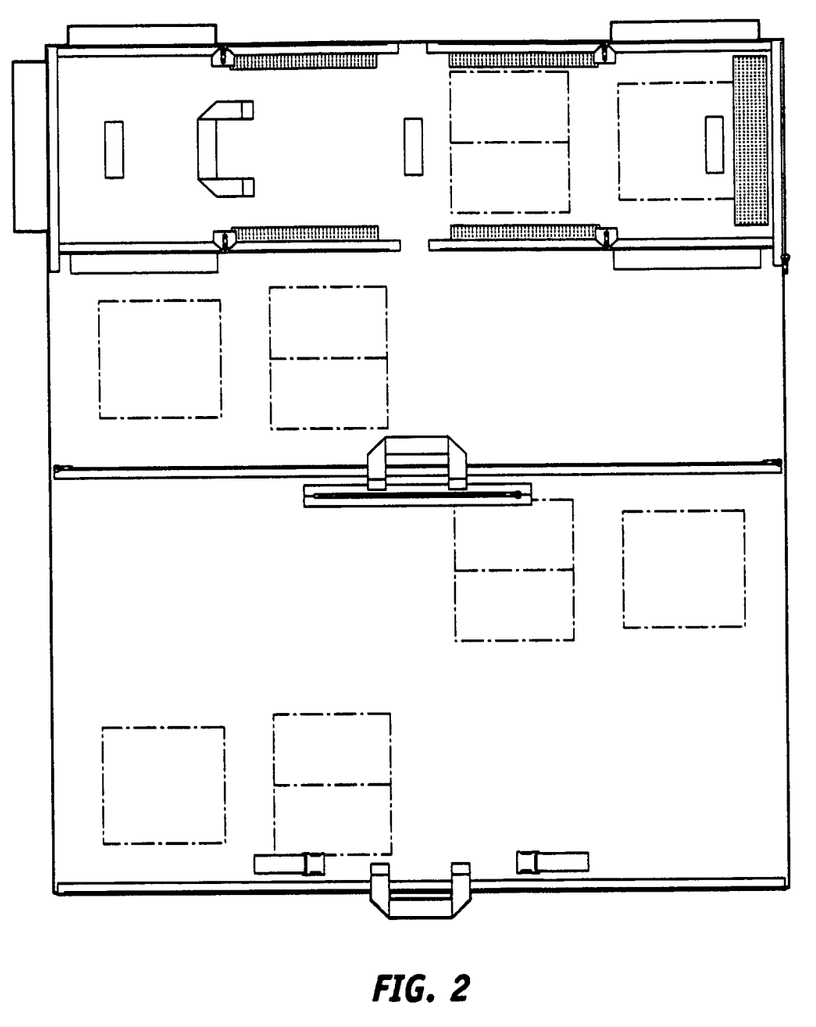
FIG. 2 is a top view of the preferred embodiment of the present invention without any rod and reels lying flat.

FIG. 2 illustrates the present invention without the rods and reels and showing the nylon shell material as described herein.

Figure 3:
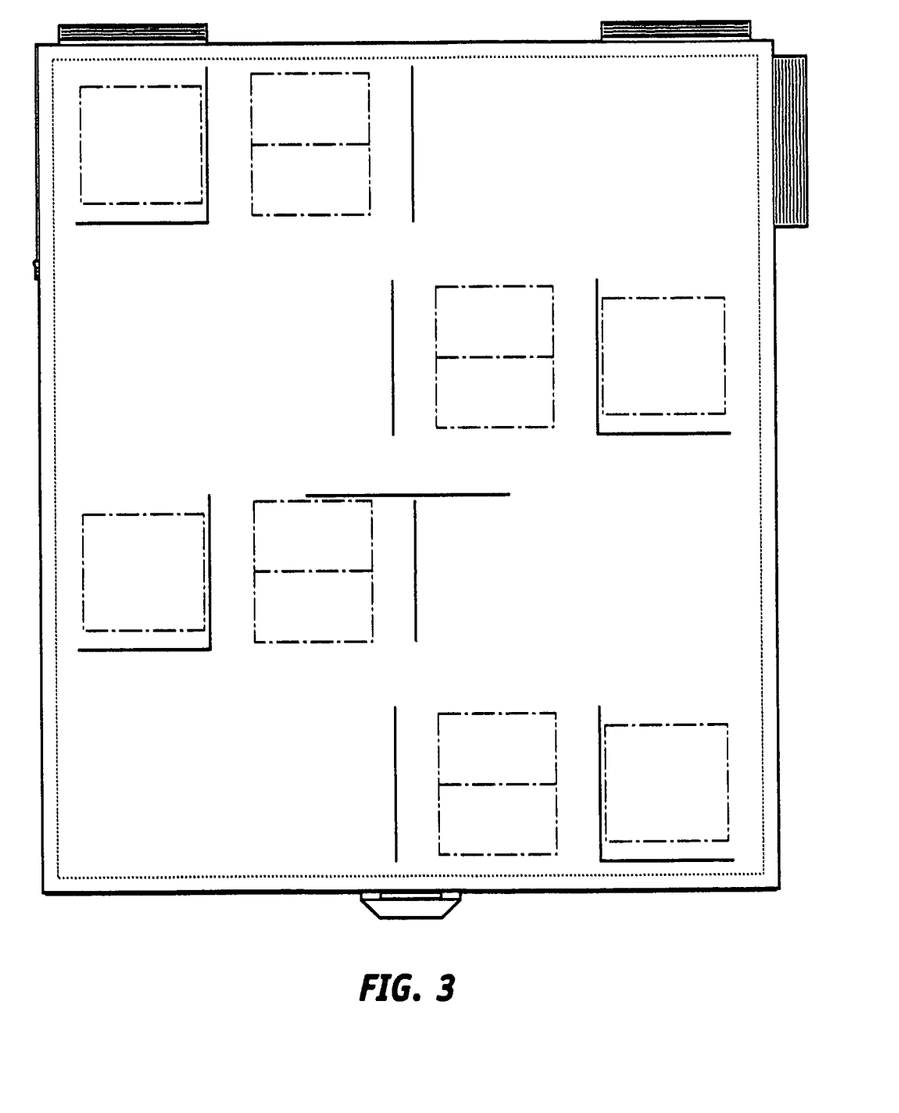
FIG. 3 is a bottom view of FIG. 1 of the preferred embodiment of the present invention showing the slots for placing the rods and reels prior to closing the carrier.

FIG. 3 illustrates the present invention without the rods and reels and showing the reverse side foam material with the slits for placing the rods and reels between the foam inserts as described herein.

Figure 4:
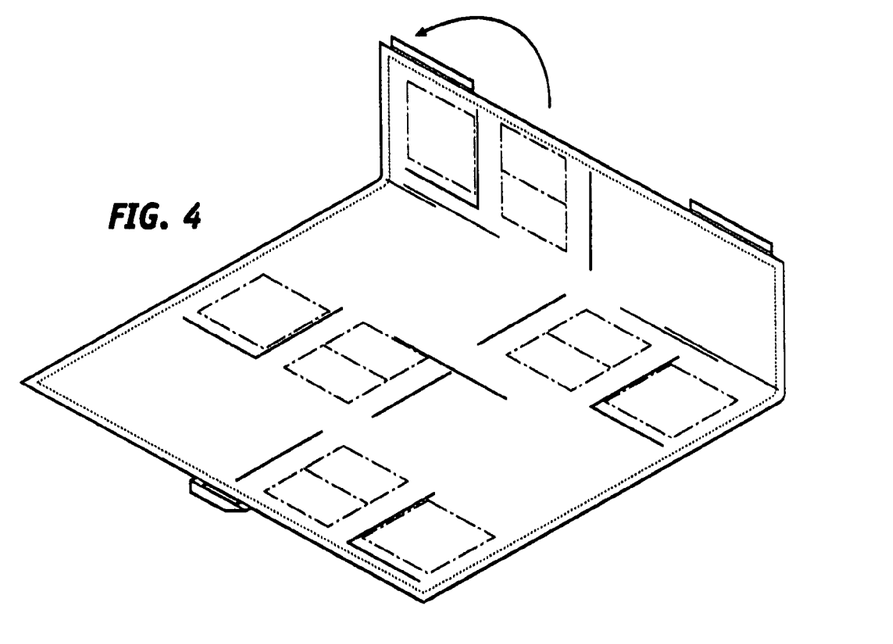
FIG. 4 is a bottom view of the preferred embodiment of the present invention showing the first fold or closing procedure.
Figure 5:
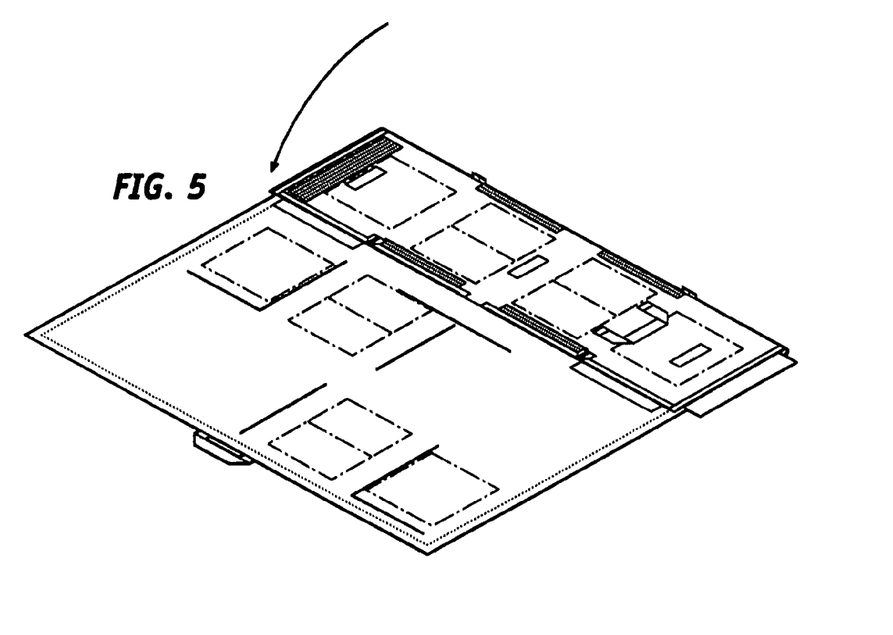
FIG. 5 is a bottom view of the preferred embodiment of the present invention of the first folding or closing procedure.

FIGS. 4 and 5 illustrate the present invention without the rods and reels and showing the closing procedure as described herein.

Figure 6:
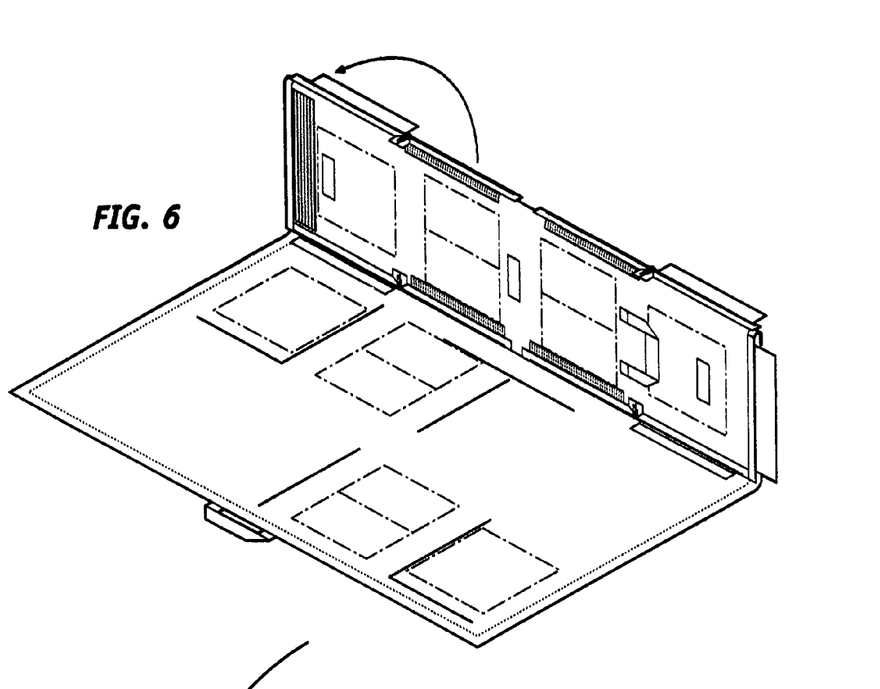
FIG. 6 is a bottom view of the preferred embodiment of the present invention illustrating the second folding or closing procedure.
Figure 7:
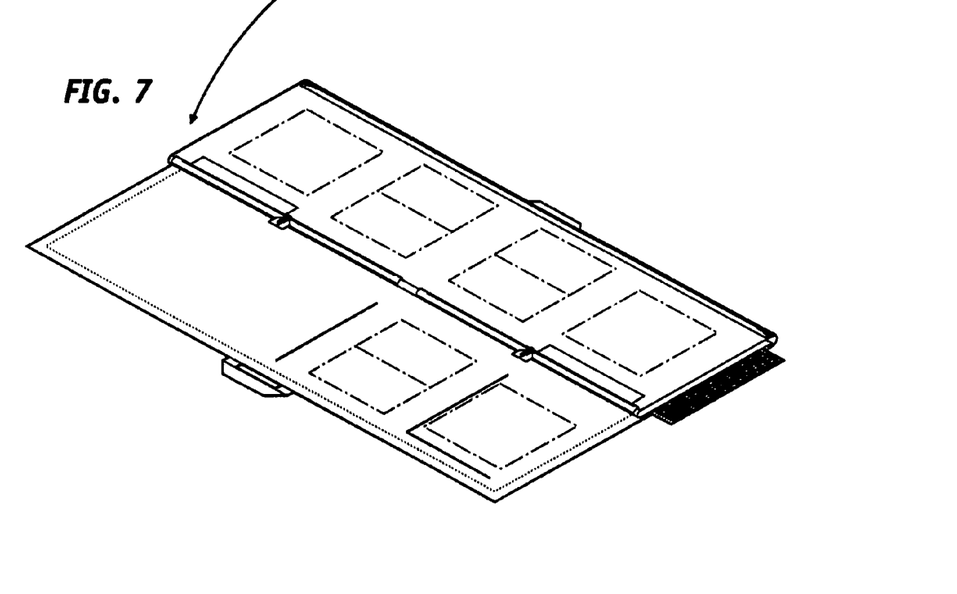
FIG. 7 is a bottom view of the preferred embodiment of the present invention of the second folding or closing procedure.

FIGS. 6 and 7 illustrate the present invention without the rods and reels and showing the final closing procedure prior to the use of the zipper or hook and loop fasteners as described herein.

Figure 8:
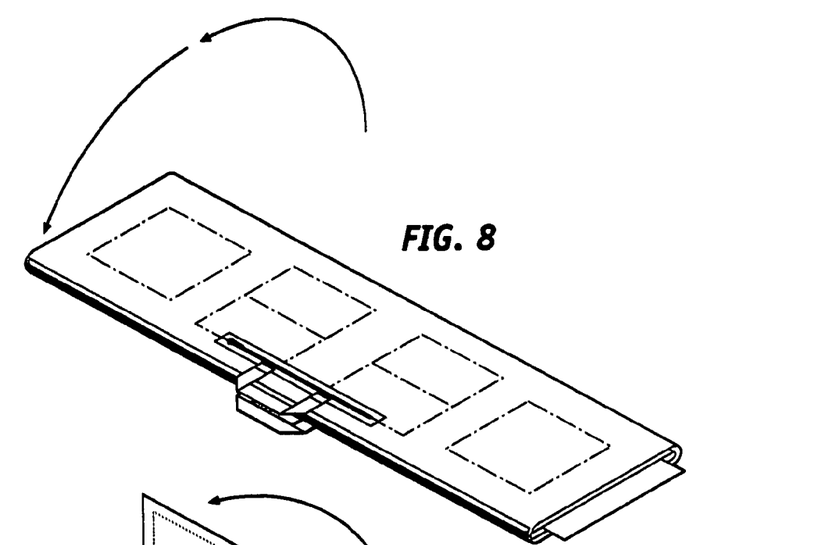
FIG. 8 is a front view of the preferred embodiment of the present invention showing the last folding or closing aspect prior to transport.

FIG. 8 illustrates the present invention without rod and reel closed prior to transport as described herein.

Figure 9:
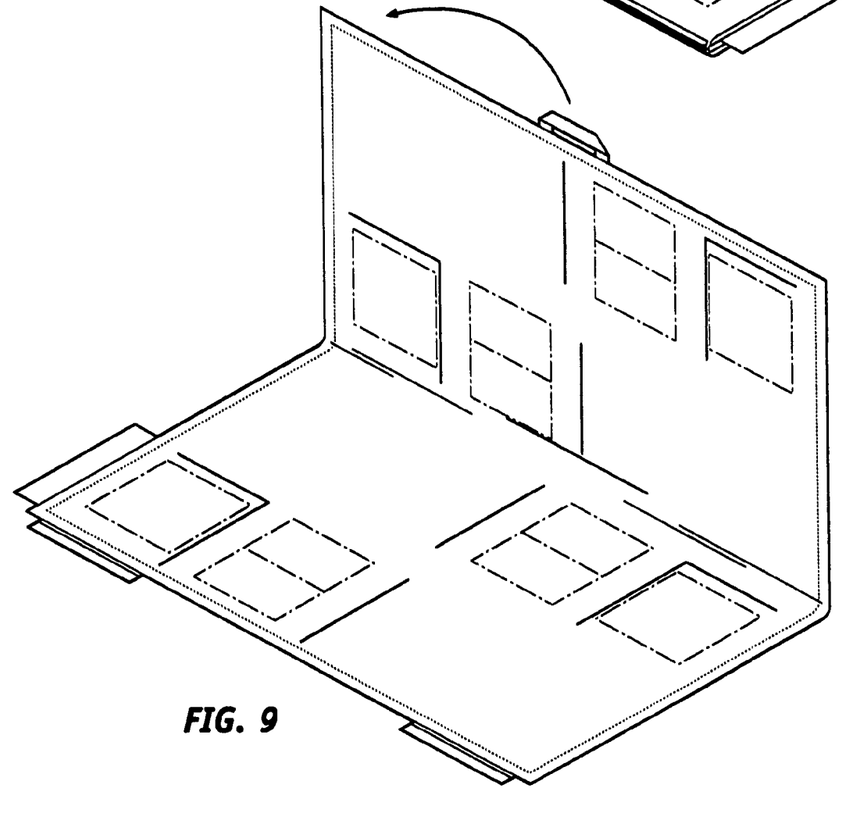
FIG. 9 is a bottom view of the second embodiment of the present invention showing the carrying case reconfigured into a seat cushion.
Figure 10:
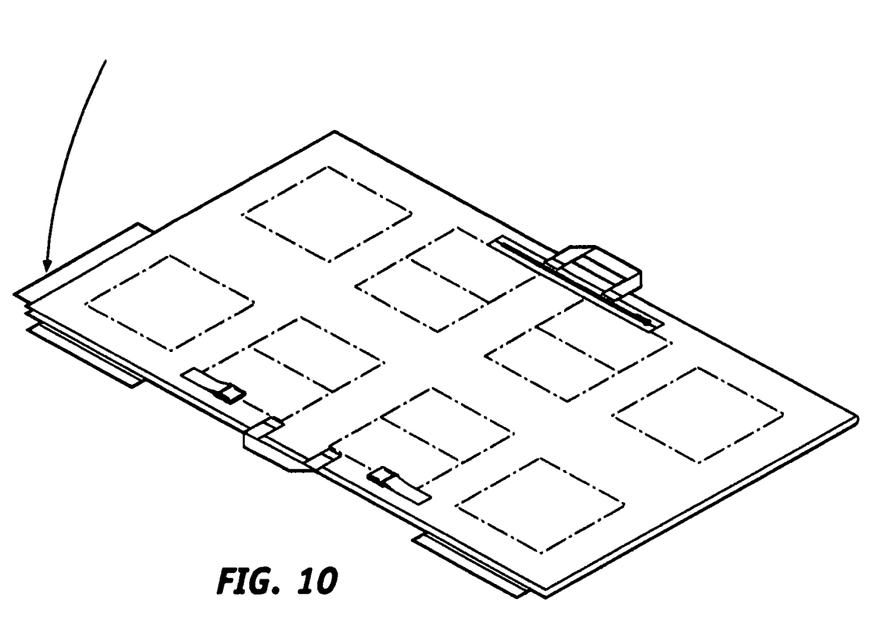
FIG. 10 is a top view of the second embodiment of the present invention showing the case prior to the second folding procedure for reconfiguring into a seat cushion.

FIGS. 9 and 10 illustrate the second embodiment of the present invention folding procedure to convert from a rod and reel carrier to a seat cushion as described herein.

Figure 11:
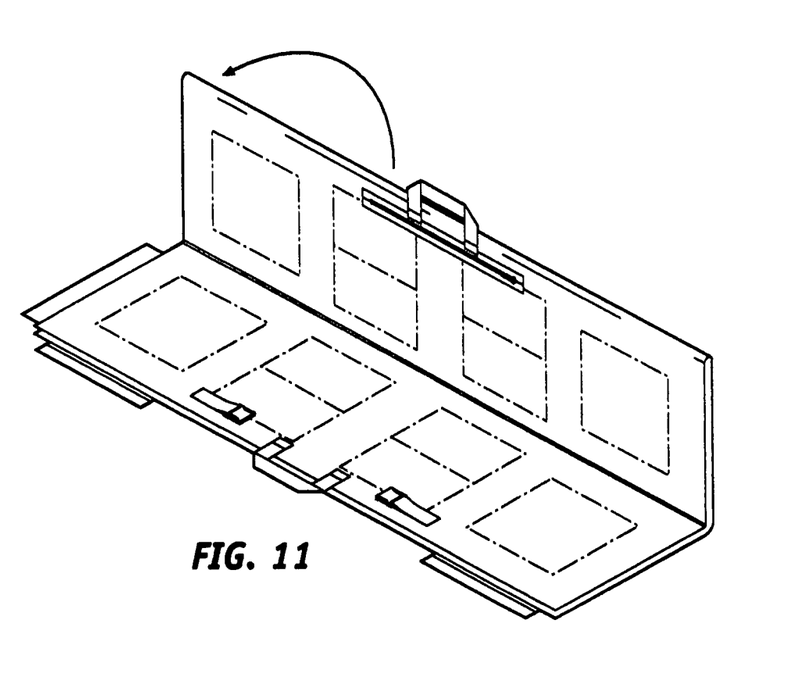
FIG. 11 is a side perspective view of the second embodiment of the present invention showing the second folding procedure of the carrying case for reconfiguring into a seat cushion.
Figure 12:
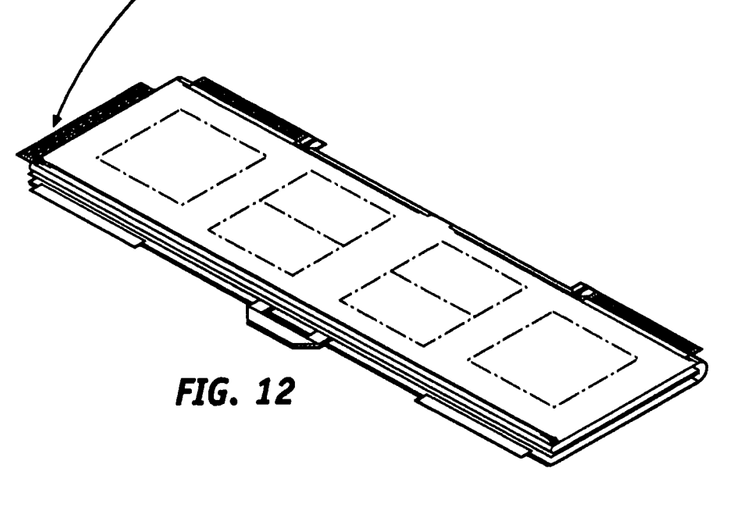
FIG. 12 is a top view of the second embodiment of the present invention showing the second folding of the carrying case for reconfiguring into a seat cushion.
Figure 13:
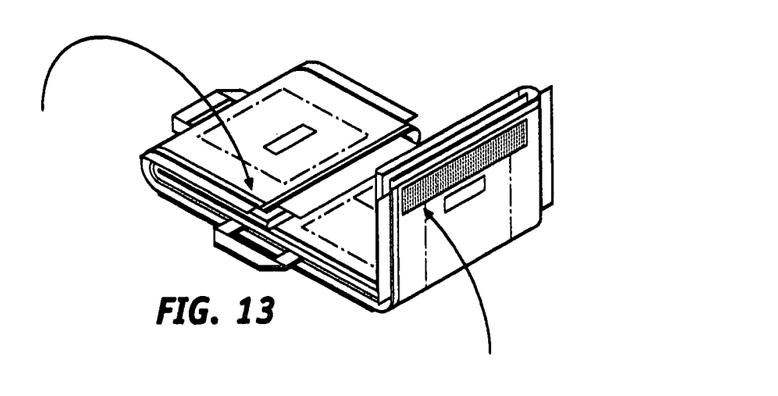
FIG. 13 is a top view of the second embodiment of the present invention showing the last folding procedure of the carrying case for reconfiguring into a seat cushion.
Figure 14:
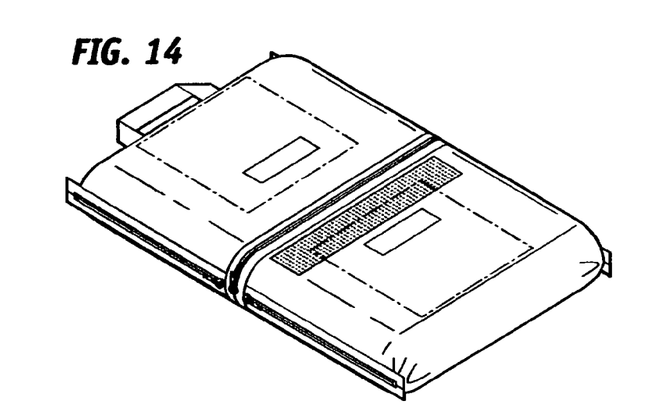
FIG. 14 is a top view of the second embodiment of the present invention.
Figure 15:
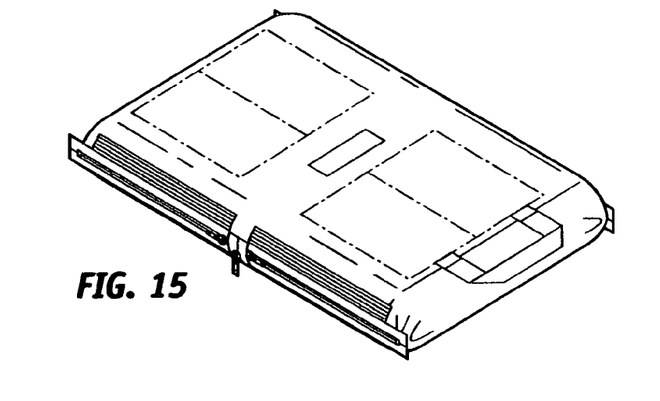
FIG. 15 is a bottom view of the second embodiment of the present invention with zippers.
Figure 16:
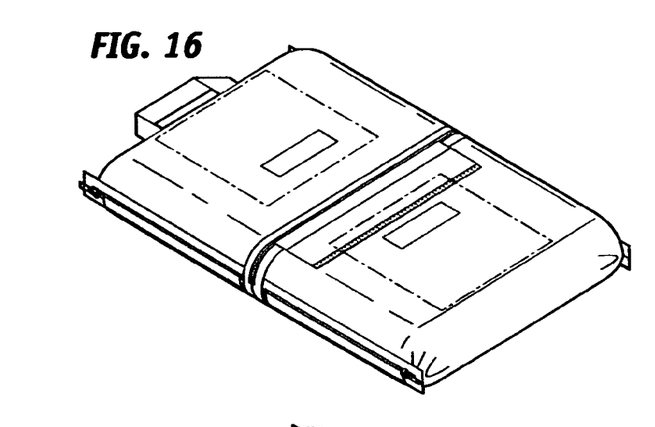
FIG. 16 is a bottom view of the second embodiment of the present invention with hook and loop fasteners
Figure 17:
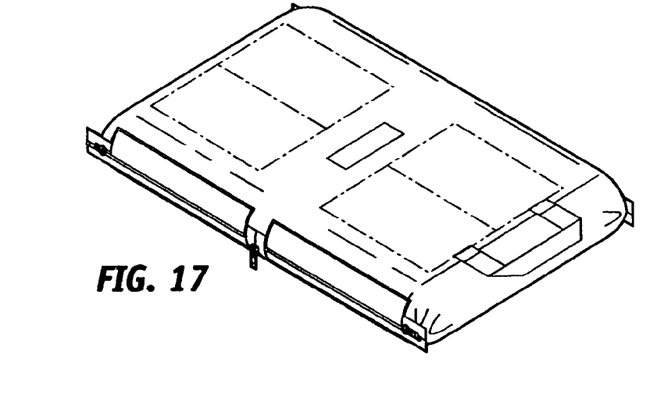
FIG. 17 is a bottom view of the second embodiment of the present invention.

FIGS. 11, 12 and 13 illustrate the second embodiment of the present invention showing the final folding procedure as described herein.

FIGS. 14-17 illustrate the second embodiment of the present invention with the zipper or hook and loop fasteners as described herein.

Figure 18:
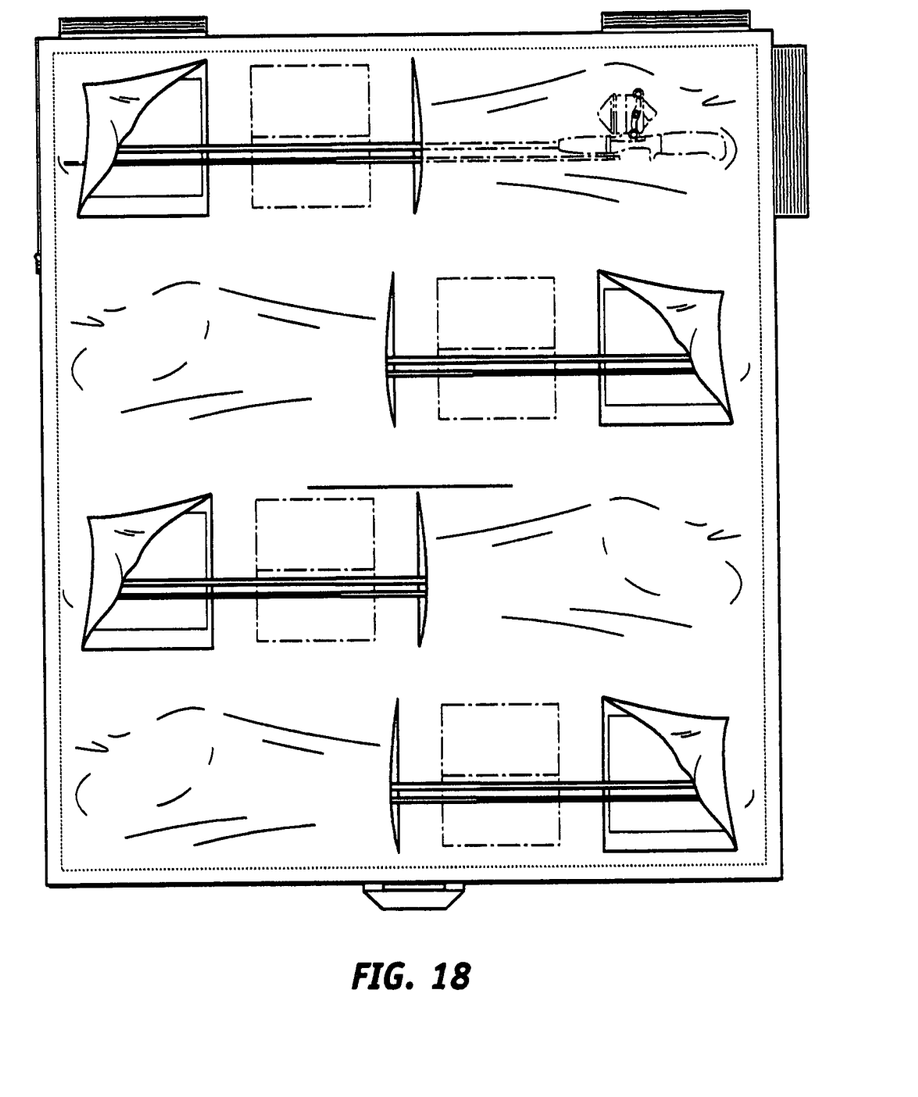
FIG. 18 is a bottom view of the preferred embodiment of the present invention showing placement of rods and reels.

FIG. 18 illustrates the present invention containing the rods and reels as described herein.

Figure 19:
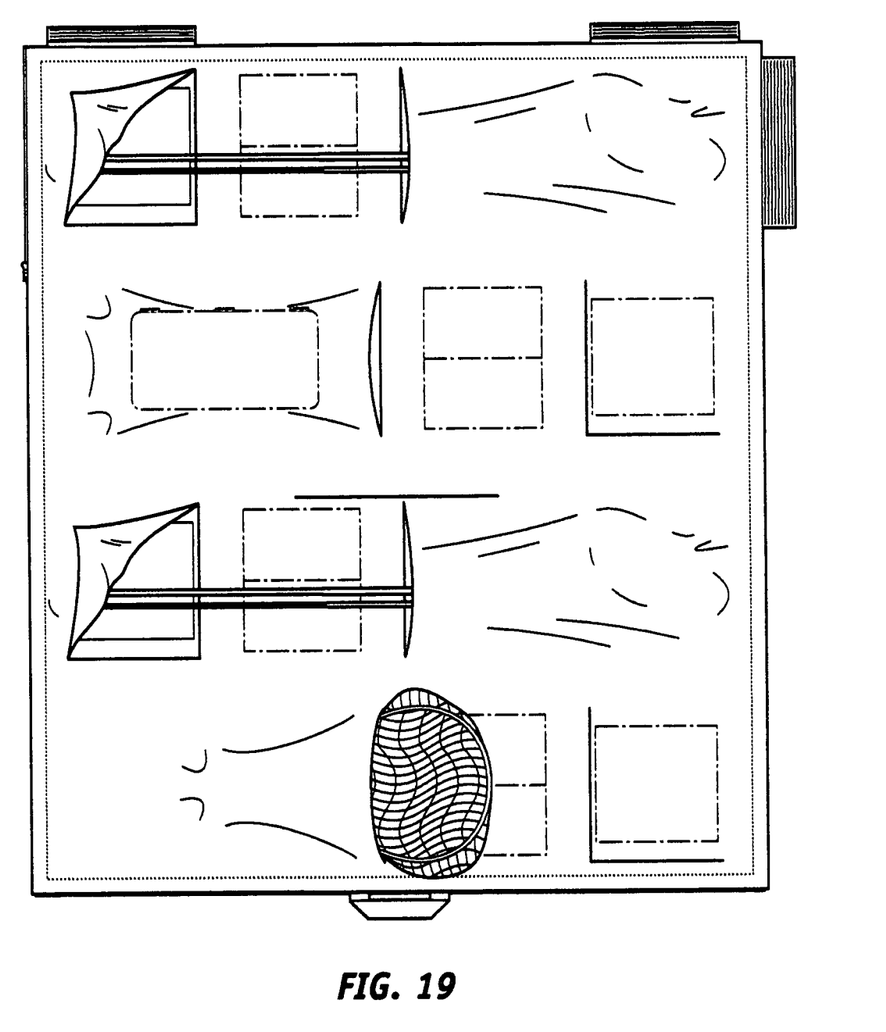
FIG. 19 is a bottom view of the preferred embodiment of the present invention showing placement of rods and reels and other equipment.

FIG. 19 illustrates the present invention containing other fishing equipment as described herein.

Figure 20:
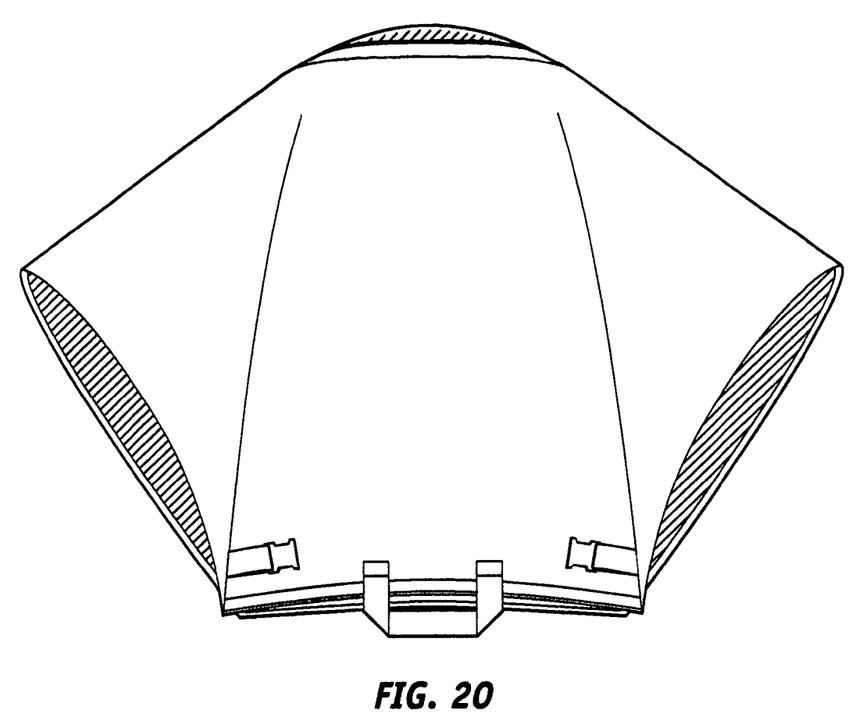
FIG. 20 is a front view of the third embodiment of the present invention showing the poncho configuration.

FIG. 20 illustrates the third embodiment of the present invention as described herein.

Figure 21:
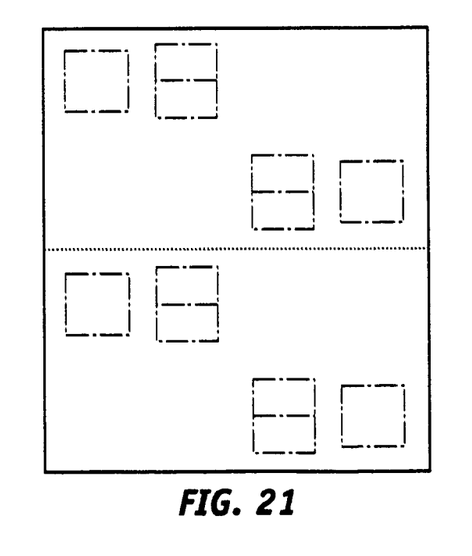
FIG. 21 is a bottom view of the fourth embodiment of the present invention
Figure 22:
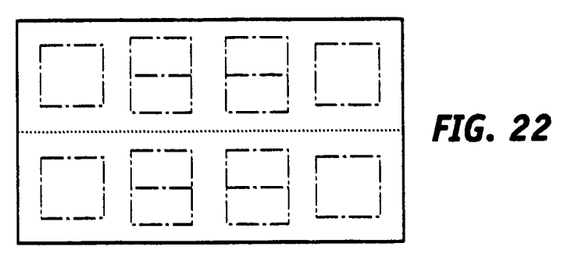
FIGS. 22-24 show the placement of the padding in the all embodiments of the present invention.
Figure 23:
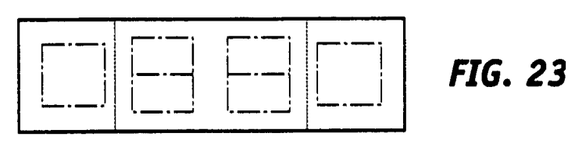
Figure 24:
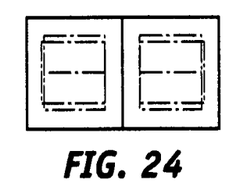
Figure 25:
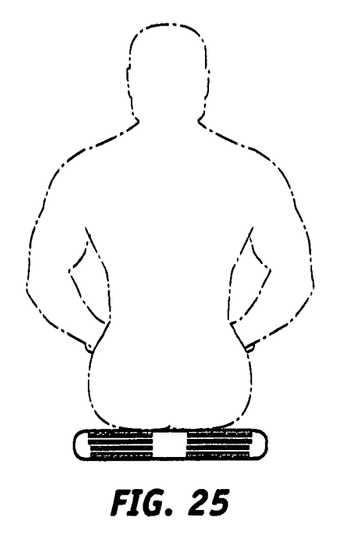
FIG. 25 is a side view of the third embodiment of the present invention showing a person invention on the cushion.

FIG. 21 illustrates the forth embodiment of the present invention as described herein.

Different embodiments may include different numbers of other uses described herein.

It should be understood, of course, that the foregoing relates to exemplary embodiments of the invention and the modifications may be made without departing from the spirit and scope of the invention as set forth in the following claims.

What is claimed is:

1. A rod and reel carrier adapted to store one or more fishing rods and reels, comprising:
a waterproof outer shell made up of a first half and a second half;
a plurality of apertures adapted to receive said rods and reels;
and a plurality of staggered pads within each half of said shell; wherein said carrier is foldable into a seat cushion configuration in which all of said pads are included in two vertically aligned sets of pads under a user's buttocks.

2. The rod and reel carrier of claim 1, wherein said pads are made of water tight foam material, creating a carrier that will not sink when carrying a maximum of 4.5 pounds of fishing or other equipment.

3. The rod and reel carrier of claim 1, wherein said carrier comprises an elongated case that is closed at one end and includes zippers or hook and loop fasteners at the other end.

4. The rod and reel carrier of claim 1, wherein a space between said two vertically aligned sets of pads prevents pressure on a user's tailbone.

5. The rod and reel carrier of claim 1, wherein said carrier includes an opening in said shell allowing a user to place said carrier over their head for use as a poncho.

6. The rod and reel carrier of claim 1, wherein said carrier can be laid out flat on the ground or wrapped around a user for warmth and water protection.

* * * * *